United States Patent [19]
Hornsey

[11] Patent Number: 5,965,853
[45] Date of Patent: Oct. 12, 1999

[54] SOUND ABSORBING AIRCRAFT TRANSPARENCY AND METHOD OF MAKING SAME

[75] Inventor: William W. Hornsey, Huntsville, Ala.

[73] Assignee: PPG Industries Ohio, Inc., Cleveland, Ohio

[21] Appl. No.: 08/966,329

[22] Filed: Nov. 7, 1997

Related U.S. Application Data

[60] Provisional application No. 60/042,463, Mar. 31, 1997.

[51] Int. Cl.$^6$ ............................................. E04B 9/00
[52] U.S. Cl. ..................... 181/289; 181/290; 181/208; 428/34
[58] Field of Search ..................... 181/284, 286, 181/289, 290, 291, 292, 294, 207, 208; 428/34, 215, 415, 425.6, 425.9, 430

[56] References Cited

U.S. PATENT DOCUMENTS

| | | |
|---|---|---|
| 2,184,876 | 12/1939 | Sherts . |
| 3,640,833 | 2/1972 | Oberst et al. . |
| 3,783,084 | 1/1974 | Quenett ................................... 181/290 |
| 4,011,356 | 3/1977 | Lambert et al. ........................ 428/34 |
| 4,047,351 | 9/1977 | Derner et al. ............................ 428/34 |
| 4,073,986 | 2/1978 | Keslar et al. . |
| 4,201,351 | 5/1980 | Tolliver . |
| 4,554,713 | 11/1985 | Chabal . |
| 4,614,676 | 9/1986 | Rehfeld . |
| 4,778,028 | 10/1988 | Staley . |
| 4,810,583 | 3/1989 | Brown et al. . |
| 4,923,757 | 5/1990 | O'Dwyer et al. . |
| 5,132,367 | 7/1992 | Chen . |
| 5,262,232 | 11/1993 | Wilfong et al. . |
| 5,368,917 | 11/1994 | Rehfeld et al. . |
| 5,584,950 | 12/1996 | Gaffigan . |
| 5,773,102 | 6/1998 | Rehfeld .................................... 428/34 |
| 5,796,055 | 8/1998 | Benson, Jr. et al. .................... 181/208 |

FOREIGN PATENT DOCUMENTS

| | | |
|---|---|---|
| 0 566 890 | 10/1993 | European Pat. Off. . |
| 0 418 123 | 6/1995 | European Pat. Off. . |
| 0 733 468 | 9/1996 | European Pat. Off. . |
| 0 750 078 | 12/1996 | European Pat. Off. . |
| 0 763 420 | 3/1997 | European Pat. Off. . |

*Primary Examiner*—Khanh Dang
*Attorney, Agent, or Firm*—Donald C. Lepiane

[57] ABSTRACT

The present invention relates to a vibration dampening/sound absorbing aircraft transparency which includes an outboard pane assembly, a vibration dampening/sound absorbing pane assembly and a spacer frame assembly for retaining the outboard pane assembly and the vibration dampening/sound absorbing pane assembly in spaced-apart generally parallel facing relationship to provide a space therebetween. The vibration dampening/sound absorbing pane assembly is a multilayer laminate which includes a substrate, an adhesive interlayer provided over a surface of the substrate and a sound dampening material layer provided over the adhesive interlayer and adhered by the adhesive interlayer to the substrate. In an alternative embodiment, the aircraft transparency of the present invention includes in addition to the foregoing, a transparent electroconductive coating interposed between the adhesive interlayer and the substrate and facilities in contact with the electroconductive coating to pass a current through the electroconductive coating to heat the coating sufficiently to remove or to prevent the accumulation of fog, ice, frost and the like on the aircraft transparency.

19 Claims, 2 Drawing Sheets

SOUND ABSORBING AIRCRAFT TRANSPARENCY AND METHOD OF MAKING SAME

CROSS-REFERENCE TO RELATED APPLICATION

This application claims priority to U.S. Provisional Application Ser. No. 60/042,463 filed Mar. 31, 1997.

BACKGROUND OF THE INVENTION

1. Field of the Invention

This invention relates to an aircraft transparency and more particularly to an aircraft transparency having vibration dampening/sound absorbing properties, optionally heating properties, and to the method of making the same.

2. Discussion of the Presently Available Technology

The transmission of unwanted sound/vibrations through an aircraft transparency and into the aircraft, in particular the aircraft cabin, is undesirable, and may cause discomfort to the cabin's occupants. Efforts have been made to reduce the transmission of sound/vibrations through aircraft transparencies. Such efforts have been generally directed to transparencies having several panes (e.g. four or more panes) maintained in spaced-apart relationship within a spacer-frame assembly, which spacer frame assembly is affixed to a corresponding opening in the body of the aircraft. The spaced panes provide-a plurality of airspaces therebetween, which, among other things, reduce or eliminate the transmission of external sound/vibrations through the transparency into the cabin.

While generally effective, such transparencies are costly and time consuming to manufacture. Further, such transparencies are heavy due to the fact that they require several panes, and as may be appreciated by those skilled in the art of aircraft manufacture, increased weight in aircraft components is undesirable because, among other reasons, it adds expense to the operation of the aircraft.

In the automotive industry, there have been efforts to improve the comfort of automobile passengers by reducing transmission of unwanted noise through the automobile's glass surfaces into the passenger compartment. Unlike the aircraft industry, such efforts in the automotive industry have generally not relied upon a plurality of spaced-apart panes to obtain the desired reduction in noise transmission. Rather, these efforts have been largely directed toward the windshield, which is generally a laminate of two glass sheets with one or more interlayers therebetween. Efforts to produce acoustically insulating windshields have generally been directed to identifying interlayer materials or combinations of interlayer materials to provide the windshield with the desired sound absorbing properties. Examples include U.S. patent application Ser. No. 08/783,596 to Benson et al., filed Jan. 1, 1997, hereby incorporated herein by reference, (hereinafter "Benson", European Patent Application Nos. EP 0 566 890 A1, and EP 0 763 420 A1, all of which describe laminated automotive glazing for acoustic insulation.

As can be appreciated by those skilled in the art, it would be advantageous to provide aircraft transparencies which reduce or eliminate the transmission of sound and/or vibrations through the transparency which eliminate the limitations of the presently available transparencies.

SUMMARY OF THE INVENTION

The present invention is directed to a two-paned aircraft transparency with vibration dampening/sound absorbing capabilities. The aircraft transparency includes an outboard pane assembly maintained in spaced relationship to an inboard vibration dampening/sound absorbing pane assembly by a spacer frame assembly to form a space therebetween. The vibration dampening/sound absorbing pane assembly includes a substrate having a major surface, and a sound dampening material layer adhered to the major surface of the substrate by an adhesive interlayer deposited over at least a portion of the major surface of the substrate.

In an alternative embodiment, the aircraft transparency of the present invention includes in addition to the foregoing, a transparent electroconductive coating interposed between the adhesive interlayer and the substrate and facilities in contact with the electroconductive coating to flow an electrical current to the electroconductive coating to heat the coating to remove or to prevent the accumulation of fog, ice, frost and the like on the aircraft transparency.

DETAILED DESCRIPTION OF THE INVENTION

Figure 1:
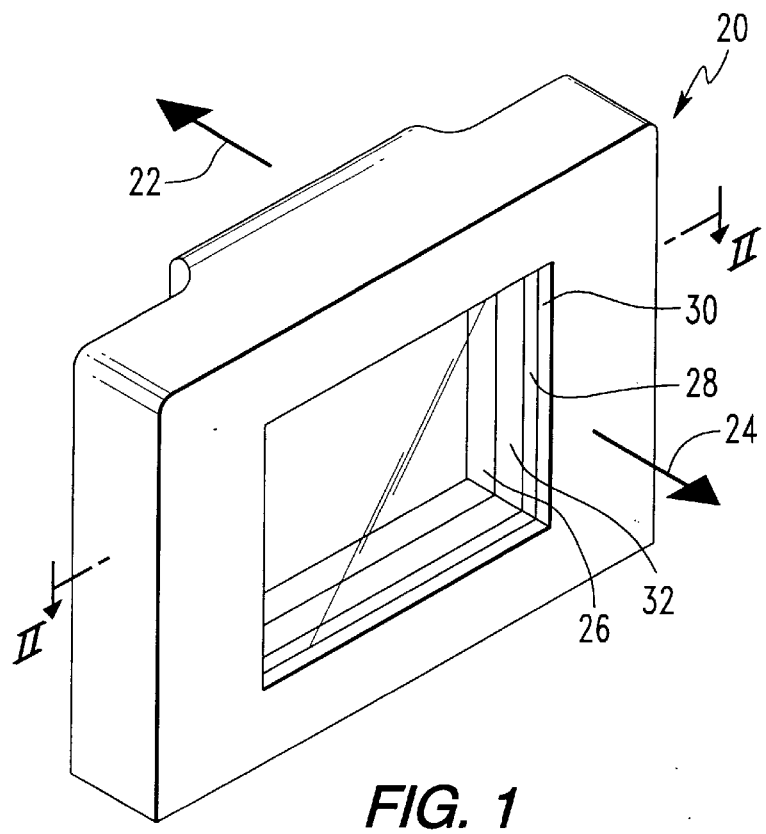
FIG. 1 is perspective view of a multiple-glazed aircraft transparency incorporating features of the present invention.

In the following description, like elements bear like reference numerals. Further, while the following discussion is primarily directed to using the transparency of the present invention as an aircraft transparency, as may be appreciated, the invention is not limited to any specific use, and the invention may be used to provide a sound dampening transparency wherever such a transparency would be useful, including but not limited to structures such as building structures and/or any type of land, air, space or water vehicle/craft.

Figure 2:
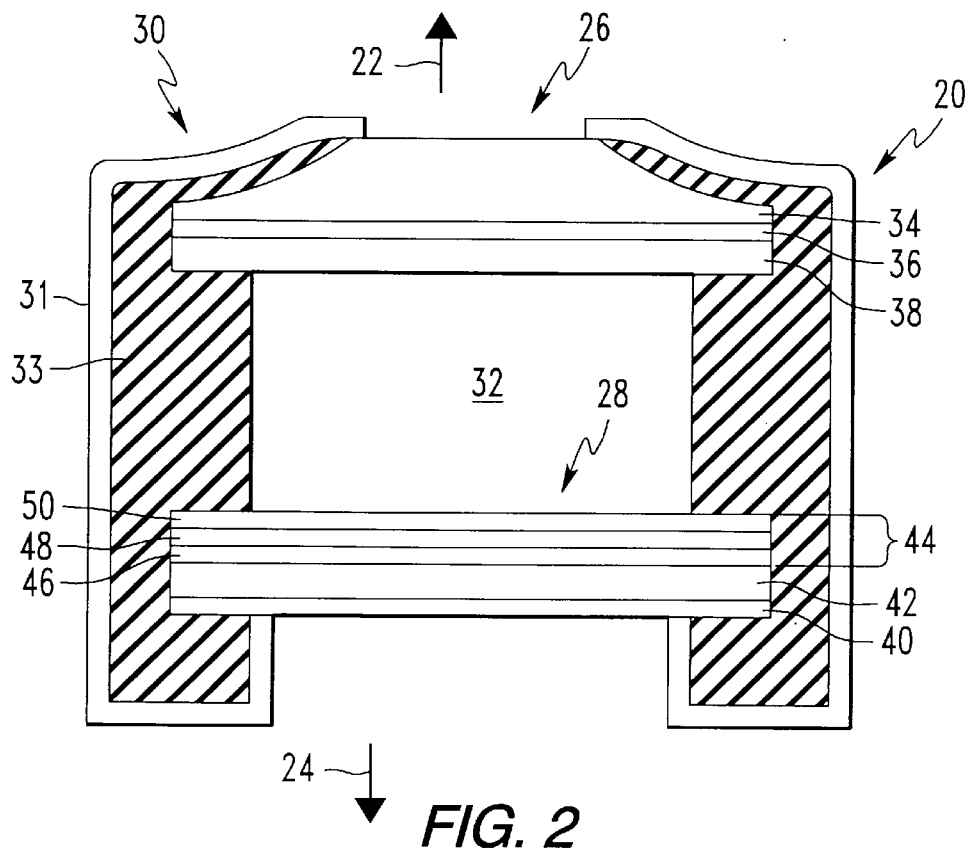
FIG. 2 is a cross-sectional view of the aircraft transparency of FIG. 1 taken along the line II—II in FIG. 1.

Referring now to FIGS. 1 and 2, there is shown the aircraft transparency 20 incorporating features of the present invention. The outboard direction of the aircraft relative to aircraft transparency 20 is shown by the arrow 22 and the inboard direction of the aircraft relative to aircraft transparency 20 is shown by the arrow 24.

Aircraft transparency 20 includes an outboard pane assembly 26 held in spaced-apart substantially parallel facing relationship with a vibration dampening/sound absorbing pane assembly 28 by a spacer frame assembly 30 forming an airspace 32 therebetween. As may be appreciated, spacer frame assembly 30 is not limiting to the invention and may be of any of several types known in the art. The spacer frame assembly 30 shown in FIG. 2 includes an optional frame 31 which surrounds a gasket 33. The gasket 33 may be any gasket material known in the art to hold outboard-pane assembly 26 in spaced relationship to vibration dampening/sound absorbing pane assembly 28. A preferred gasket material is rubber. The frame 31 may be made of any structurally stable material and is preferably made of a metal, e.g. aluminum, and operates to protect gasket material 33 from damage and to provide additional structural stability to aircraft transparency 20. The gasket 33, frame 31 and pane assemblies 28 and 26 are assembled in any convenient manner to provide the window 20.

The airspace 32 among other things, provides thermal insulation between the atmosphere external of the aircraft cabin and the atmosphere within the cabin. The airspace 32 may be in fluid communication with the atmosphere external of the airspace (i.e. an unsealed unit) or it may not be in fluid communication with the atmosphere external of the airspace (i.e. a sealed unit), although an unsealed unit is generally preferred in order to prevent a pressure build-up within the airspace during flight.

Whether a sealed or unsealed unit, it is desirable to ensure that the airspace remains free of moisture, and a desiccant may be associated with airspace 32 for that purpose in any manner known in the art. In lieu of or in addition to the desiccant, one or more of the surfaces of the aircraft transparency in contact with the airspace 32 may be coated with functional coatings including, but not limited to coatings to remove moisture or surface contaminants such as photocatalytically-activated self-cleaning coatings as described in U.S. patent application Ser. No. 08/899,257 entitled PHOTOCATALYTICALLY-ACTIVATED SELF-CLEANING ARTICLE AND METHOD OF MAKING SAME filed Jul. 23, 1997, in the name of Greenberg et al. or photoelectrolytically desiccating coatings as described in U.S. patent application Ser. No. 08/927,130 entitled PHOTOELECTROLYTICALLY-DESICCATING MULTIPLE-GLAZED WINDOW UNITS filed Sep. 2, 1997, in the name of James P. Thiel, each of which is hereby incorporated herein by reference.

Where airspace 32 is sealed, the airspace may be fully or partially filled with an insulating gas such as air, argon, krypton or mixtures thereof.

While the dimensions of airspace 32 are not limiting to the invention provided airspace 32 provides the thermal insulation, for an aircraft transparency having overall dimensions of about 20 inches (51 cm) in width by about 25 inches (64 cm) in height with an overall thickness in the range of about 1.5 to 2.5 inches (3.8 to 6.4 cm), an airspace thickness in the range of about 1.0 inch (2.54 cm) to 2.0 inches (5.08 cm), is acceptable.

Outboard pane assembly 26 may be a monolithic piece or it may be a laminate piece. The laminate piece may include laminates of two or more panes of glass or plastic, which may additionally include one or more interlayers disposed between the panes or the laminate may include the combination of a single pane and one or more interlayer materials laminated thereon to form the outboard pane assembly 26. The glass panes may be chemically or thermally tempered. Suitable plastic panes include cast acrylics, stretched acrylics, and polycarbonates. Suitable interlayer materials include polyvinyl butyral, urethanes, silicones and combinations thereof.

Outboard pane assembly 26 may be flat or may include one or more curved surfaces including convex and concave curved surfaces. Additionally, outboard pane assembly 26 may include one or more films or coatings deposited on one or more surfaces in order to provide the aircraft transparency with a wide variety of performance characteristics, e.g. but not limited to antireflecting coatings, ultraviolet absorbing coatings, electromagnetic radiation coatings, and antiabrasion coatings.

In a preferred embodiment as shown in FIG. 2, outboard pane assembly 26 includes a first stretched acrylic ply 34 adhered by an interlayer 36 to a second stretched acrylic ply 38. The interlayer 36 bonds the two stretched acrylic plies 34 and 38 together to provide an assembly that has less deflection due to aircraft pressurization and correspondingly improved service life. It also provides fail-safe capability since each of plies 34 and 38 are designed to withstand the rigors of flight should the other ply fail in service. The interlayer 36 is preferably plasticized polyvinyl butyral. When outboard pane assembly 26 is a laminate including one or more convex or concave surfaces, the interlayer 36 may be differentially stretched e.g. as disclosed in U.S. Pat. Nos. 4,201,351 and/or 4,554,713, both of which are hereby incorporated herein by reference. Plies 34 and 38 may be of any thickness; however, as can be appreciated by those skilled in the art, increasing the thickness of plies 34 and 38 beyond that needed to withstand the rigors of flight undesirably increases the weight of outboard pane assembly 26. For example for many applications, a thickness for ply 34 in the range of about 0.31 to 0.40 inch (0.79 to 1.02 cm), a thickness for ply 38 in the range of about 0.20 to 0.40 inch (0.51 to 1.02 cm) and a thickness for interlayer 36 in the range of about 0.025 to 0.05 inch (0.06 to 0.13 cm) is acceptable to withstand the rigors of flight and provide the above-described capabilities.

Vibration dampening/sound absorbing pane assembly 28 of the present invention is a multilayer laminate. As shown in FIG. 2, vibration dampening/sound absorbing pane assembly 28 includes substrate 40 over which is deposited an adhesive interlayer 42 over which in turn is deposited a sound dampening material layer 44 to form vibration dampening/sound absorbing pane assembly 28. Adhesive interlayer 42 adheres sound dampening material layer 44 to substrate 40, while sound dampening material layer 44 in combination with the adhesive interlayer 42 reduces or eliminates or assists in the reduction or elimination of the transmission of sound/vibrations through aircraft transparency 20. Each of the above-described three components of the vibration dampening/sound absorbing pane assembly 28 will now be discussed in more detail.

The substrate 40 may be any substrate compatible with the rigors of flight and which cooperates with interlayer 42 and sound dampening material layer 44 to reduce or eliminate the transmission of sound/vibrations through aircraft transparency 20. The substrate 40 may be a monolithic piece or it may be a laminate piece. When the substrate 40 is a laminate piece it may include laminates of two or more panes, which may additionally include one or more interlayers disposed between the panes or the laminate piece may include the combination of a single pane and one or more interlayers laminated together to form the substrate 40. Suitable panes for either a monolithic or a laminate substrate 40 include panes of either glass or plastic. The glass panes may be chemically or thermally tempered. A particularly preferred glass is a chemically tempered glass available from PPG Industries, Inc., of Pittsburgh, Pa., under the trademark Herculite® II. This glass is preferred because of its extremely high strength to weight ratio, allowing the glass substrate to be thinner and lighter than thermally-tempered glass without compromising strength or optics. Suitable plastic panes include cast acrylics, stretched acrylics, and polycarbonates. Suitable interlayer materials include polyvinyl butyral, urethanes, silicones and combinations thereof.

The substrate 40 may include functional coatings (e.g. but not limited to infrared radiation attenuating coatings, ultraviolet radiation attenuating coatings, antireflective coatings).

The substrate 40 may be flat or may include one or more curved surfaces, including concave and/or convex surfaces. The thickness of substrate 40 is not limiting to the invention provided the material from which it is formed and the selected thickness cooperate with adhesive interlayer 42 and sound dampening material layer 44 to provide the desired or required degree of vibration dampening/sound absorption. As can be appreciated by those skilled in the art, increasing the thickness of the substrate 40 beyond the foregoing undesirably increases the weight of the transparency. Where the substrate is formed of Herculite® II chemically tempered glass, a thickness in the range of 0.06 to 0.12 inch (0.15 to 0.30 cm) when combined with the polyvinyl butyral adhesive interlayer and SpallShield® sound dampening material layer described below has been found to be acceptable for many applications.

The adhesive interlayer 42 may be formed any material which adheres the sound dampening material layer 44 to the substrate. Examples include but are not limited to one or more sheets of materials selected from plasticized polyvinyl butyral, urethane or combinations thereof. Where substrate 40 includes convex or concave surfaces, the adhesive interlayer 42 may be differentially stretched e.g. as disclosed in U.S. Pat. Nos. 4,201,351 and/or 4,554,713. The preferred adhesive interlayer 42 is polyvinyl butyral because it has been found to be fully compatible with the SpallShield® sound dampening material layer 44 disposed thereover as discussed below. The thickness of adhesive interlayer 42 is not limiting to the invention; however, provided it should be sufficient to adhere sound dampening material layer 44 to substrate 42 and to cooperate with substrate 40 and sound dampening material layer 44 to provide the desired vibration dampening/sound absorbing capabilities. A thickness for adhesive interlayer 42 within the range of about 0.02 to 0.03 inch (0.05 to 0.08 cm) thick has been found to be acceptable for many applications.

The sound dampening material layer 44 of the present invention may be any sound dampening material which cooperates with adhesive interlayer 42 and substrate 40 to provide a desired or required degree of vibration dampening/ sound absorption. Cooperate here means, among other things, that the sound dampening material layer 44 is adhered to the substrate 40 by the adhesive interlayer 42, and remains so in the rigors of flight, while providing an acceptable level of vibration dampening/sound absorption.

In a preferred embodiment, sound dampening material layer 44 is a multilayer laminate which includes a polyvinyl butyral base layer 46 over which is adhered a layer of polymer 48, e.g. polyester, to provide a vibration dampening/sound absorbing laminate. In a preferred embodiment, an abrasion resistant coating 50 is provided over the polymer 48 as shown in FIG. 2.

Such a multilayer laminate is available from the DuPont De Nemours Corporation of Wilmington, Del., (hereinafter "DuPont" under the trademarks "SentryGlas®" and/or "SpallShield®". The SentryGlas® multilayer composite laminate is marketed by DuPont as a plastic composite material that is laminated to glass to produce vandal and burglary resistant glass. More particularly, the DuPont SentryGlas® multilayer composite operates to prevent spalling, which is the shower of razor-sharp glass pieces which occurs opposite the side of impact when a glass pane, particularly a tempered glass pane is broken. While it is known to laminate the DuPont SentryGlas® multilayer composite directly to a glass surface to prevent spalling, it has been heretofore unknown to use such a composite in the particular arrangement of components of the present invention e.g. with adhesive interlayer 42, substrate 40, airspace 32, outboard pane assembly 26 and spacer frame assembly 30 to provide the vibration dampening/sound absorbing aircraft transparency of the present invention.

3010 SentryGlas® multilayer composite sold by DuPont includes a 30 mil thick polyvinyl butyral base layer 46 and a 10 mil thick polyester layer 48 composite, has been found to provide an acceptable sound dampening material layer for the present invention. The mechanism by which the arrangement of components of the present invention interacts to produce a vibration dampening/sound absorbing aircraft transparency is not yet completely understood, however the vibration dampening/sound absorbing benefits have been realized.

Figure 3:
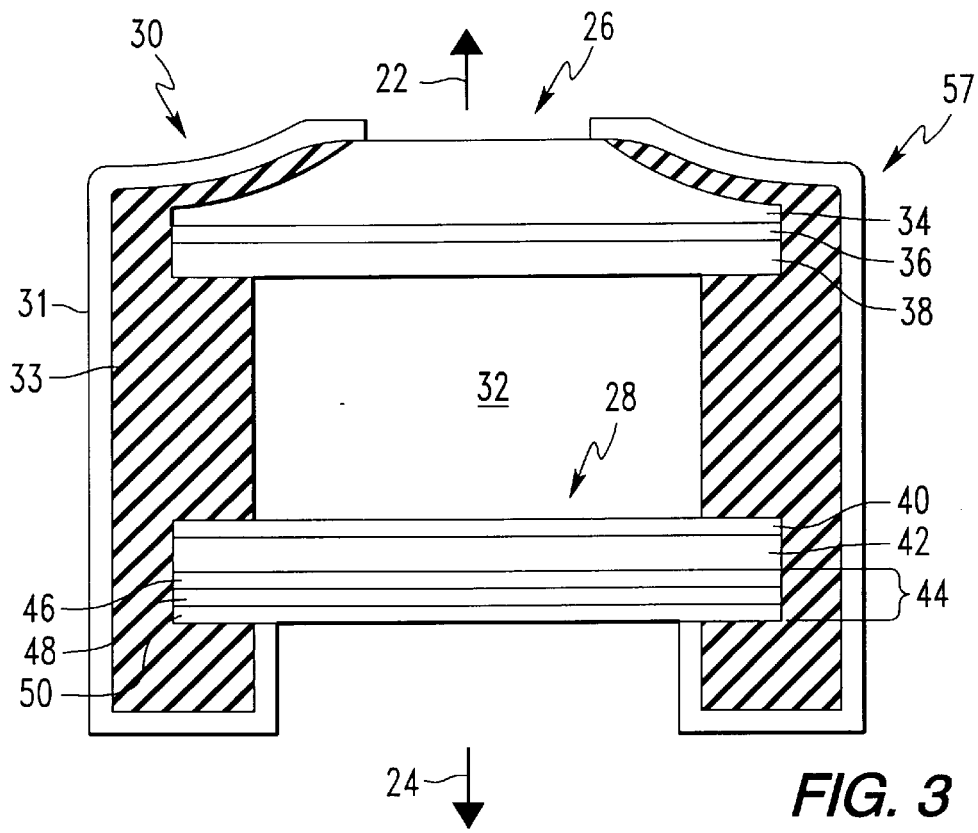
FIG. 3 is a view similar to the view of FIG. 2 illustrating an alternative embodiment of the present invention.

Referring now to FIG. 3, there is shown aircraft transparency 57 incorporating features of the invention in which the orientation of vibration dampening/sound absorbing pane assembly 28 has been reversed relative to its orientation in FIG. 2. More particularly, the substrate 40 forms one of the boundaries for the airspace 32, while the sound dampening material layer 44 is oriented toward the inboard portion of the aircraft. Of the alternative embodiments shown in FIGS. 2 and 3, the embodiment of FIG. 2 is preferred because where substrate 40 is a glass substrate it is generally more resistant to scratches or other damage than when abrasion resistant coating 50 forms the most inboard surface.

Figure 4:
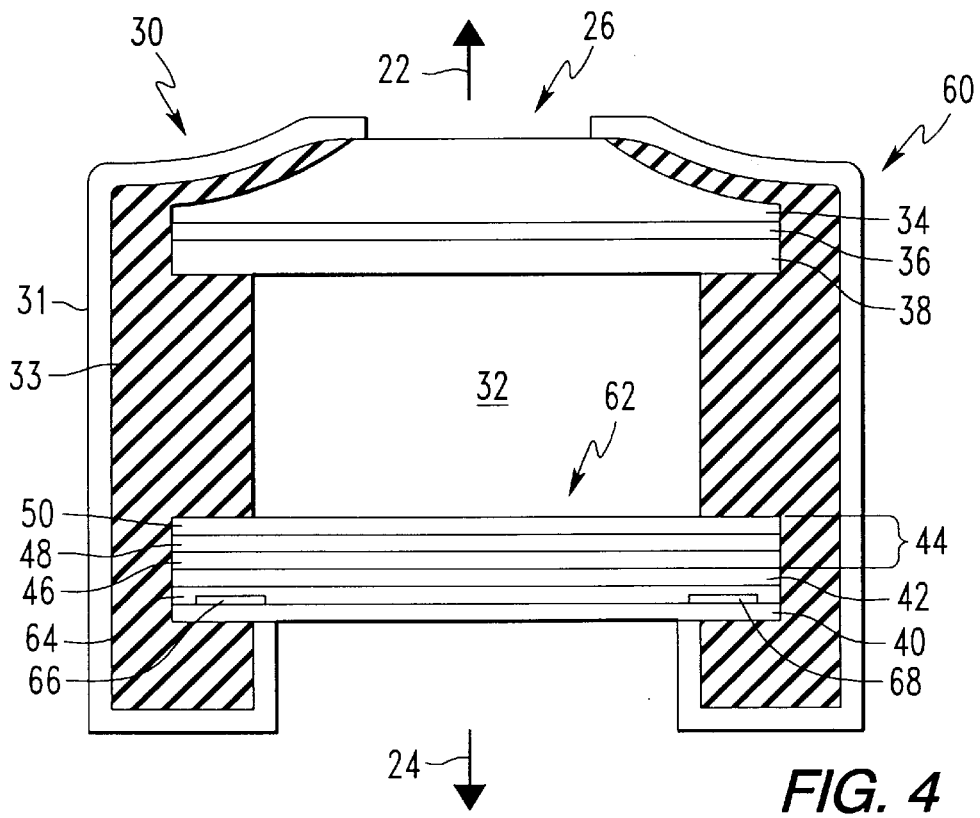
FIG. 4 is a view similar to the view of FIG. 2 illustrating still of another alternative embodiment of the present invention.

In still another embodiment of the present invention as shown in FIG. 4, aircraft transparency 60 includes vibrations dampening/sound absorbing heatable pane 62 which in addition to the foregoing components discussed above in connection with vibration dampening/sound absorbing pane 28, includes a transparent electroconductive coating 64 between the adhesive interlayer 42 and the substrate 40. Facilities 66 and 68 (e.g. bus bars and lead wires as explained in more detail below) are in contact with the electroconductive coating 64 and spaced from one another, to pass electrical current through the electroconductive coating 64 to heat the electroconductive coating 64 to remove or to prevent the accumulation of moisture, particularly fog, particularly on the surfaces of the outboard pane assembly 26 and the vibration dampening/sound absorbing assembly 28 in contact with the airspace 32. In a preferred embodiment, the facilities 66 and 68 are adhered to the substrate 40 and the transparent electroconductive coating 64 is provided over the substrate 40 and the facilities 66 and 68. The preferred electroconductive coating 64 is a metal or metal oxide. The electroconductive coating 64 may be applied by any of several methods, including pyrolysis, chemical vapor deposition and magnetron sputtering. Particularly preferred is a tin oxide electroconductive coating. Tin oxide electroconductively coated glass is available from PPG Industries, Inc. of Pittsburgh, Pa., and is marketed under the trademark "NESA®". Still more particularly preferred is an indium tin oxide electroconductive coating. Indium tin oxide electroconductively coated glass is available from PPG Industries, Inc., and is marketed under the trademark "NESATRONO®", and is preferred because it combines the durability of the NESA® coated glass with the efficiencies of providing defogging and deicing properties while operating at lower voltages.

The transparent electroconductive coating 64 is preferably about 200 to 1300 Å thick. The thickness of the electroconductive coating 64 may be uniform or may vary over the surface of the substrate 40 to accommodate varying distances between the bus bars to promote uniform heating. For example, where the substrate 40 includes a convex or concave surface, the facilities 66 and 68 may be in closer proximity to each other over certain portions of the substrate 40 and further apart in others. When in closer proximity, the electroconductive coating 64 between the facilities 66 and 68 may be made thinner and conversely. Where facilities 66 and 68 are spaced furthest apart, the electroconductive coating 64 may be made thicker to provide uniform heating of the electroconductive coating 64 in the presence of the applied electrical current.

The facilities 66 and 68 include, but are not limited to bus bars which may be mounted along longitudinal edges of the substrate 40. Where bus bars are used, they may be mounted over the substrate 40 by any manner known in the art which produces a strong and durable bond between bus bars and the substrate 40. Where the substrate 40 is a glass substrate, bus bars comprised of silver or a silver containing composition may be bonded to the glass surface in any manner known by those skilled in the art. Silk screening a silver-containing emulsion followed by curing with heat provides an example of one process by which silver-containing bus bars may be bonded to a glass substrate. A lead wire (not shown) is connected, preferably by soldering, to each bus bar, and each lead wire is in turn connected to a source of electrical potential (not shown), in order to provide an electrical potential difference between the bus bars which heats the electroconductive coating to remove fog, ice, frost and the like that forms on the aircraft transparency 60. While the dimensions of the facilities 66 and 68 will vary with the dimensions of the transparency as may be appreciated by those skilled in the art, silver bus bars about 0.0002 to 0.0008 inch (0.0005 to 0.002 cm) thick are acceptable for most applications.

Adhesive interlayer 42 is disposed over electroconductive coating 64 and facilities 66 and 68, and functions to adhere sound dampening material layer 44 thereover, as discussed above. While vibration dampening/sound absorbing pane assembly 62 has been shown in FIG. 4 with substrate 40 as the most inboard surface of the aircraft transparency, as may be appreciated, in an alternative embodiment not shown, the orientation vibration dampening/sound absorbing pane assembly 28 relative to outboard pane assembly 26 may be reversed such that sound dampening material layer 44 forms the inboard surface of the aircraft transparency with substrate 40 forming one of the boundaries of airspace 32.

The overall thickness of the improved aircraft transparency 20 of the present invention from the outboard surface of the outboard pane assembly 26 to the inboard surface of the vibration dampening/sound absorbing pane assembly 28 is about 1.5 to 2.5 inches (3.8 to 6.4 cm) thick depending upon the chosen thickness of the airspace 32, as discussed above.

The following is an example of the present invention; however, as may be appreciated, the invention is not limited thereto.

EXAMPLE

A curved and generally elliptically shaped piece of Herculite® II chemically tempered glass available from PPG Industries, Inc., Pittsburgh, Pa., measuring about 20 inches wide by 25 inches long by 0.08 inch thick (51 cm×64 cm×0.20 cm) and having its major axis in a generally horizontal plane. The Glass was provided with a pair of spaced bus bars along the neutral edges of the elliptical piece. The bus bars were generally in the shape of semicircular strips and oriented in a plane generally parallel with the vertical plane of the glass. In this orientation, the ends of each of the spaced bus bars were generally in closer proximity to each other than their respective mid-sections. The bus bars were provided as a silver-containing emulsion which was applied via a silk-screening process over a portion of the surface of the Herculite® II glass. Each bus bar measured about 0.25 inch wide by 20 inches in length along the radius of curvature by 0.0005 inch thick (0.63 cm×51 cm×0.001 cm). The glass substrate/bus bar assembly was heated in an oven at an elevated temperature in the range of about 150° F. (65° C.) to about 500° F. (260° C.) for about 90 minutes to bond the bus bars to the piece. The above described assembly was then overcoated with an indium tin oxide coating which was formed over the assembly by magnetron sputtering. The thickness of the electroconductive coating was varied from about 200 Å where the ends of the respective bus bars were in closest proximity to each other to about 1300 Å where the bus bars were spaced furthest from each other in order to obtain uniform heating of the electroconductive coating in the presence of applied electrical potential. A second pair of spaced bus bars having about the same dimensions as the first pair of bus bars previously described was then applied by the above-described silk screening process over the electroconductive coating directly over each of the bus bars previously provided. The second pair of bus bars was bonded to the electroconductive coating by heating the assembly in an oven at an elevated temperature in the range of about 150° F. (65° C.) to about 500° F. (260° C.) for about 90 minutes. The pairs of spaced bus bars were used to obtain uniform heating of the electroconductive coating. A first lead wire was then soldered to each of the second pair of bus bars.

An adhesive interlayer was deposited over the above-described value of a sheet assembly. The adhesive interlayer was a 0.03 inch (0.08 cm) thick sheet of polyvinyl butyral which had been cut to the approximate dimensions of the glass substrate and was then placed over the assembly.

A sound dampening material layer was provided over the adhesive interlayer. The sound dampening material layer was a sheet of 3010 SentryGlas® composite available from DuPont De Nemours Corporation of Wilmington, Del., which had similarly been cut to the approximate dimensions of the glass substrate.

The above described assembly was laminated by placing the assembly in an autoclave at 300° F. (148° C.) and forcing the assembly together with approximately 200 pounds per square inch (hereinafter "psi" pressure for a period of about 45 minutes, whereupon the surfaces of the adhesive interlayer became tacky and laminated to provide the vibration dampening/sound absorbing pane assembly.

An outboard pane assembly was provided as follows. An outboard acrylic layer of stretched acrylic, measuring about 20 inches wide by 25 inches long by 0.39 inch thick (51 cm×64 cm×0.99 cm) was obtained. The outboard pane was provided with a radius of curvature of about 47 inches (119 cm) by forming at a temperature of about 210° F. for 6 hours at a vacuum of about 28 inches. Similarly, an inboard acrylic layer of stretched acrylic, measuring about 20 inches wide by 25 inches long by 0.20 inch (51 cm×64 cm×0.51 cm) thick was obtained and was provided with a radius of curvature of about 47 inches (119 cm) in the vacuum mold described above at about the same time, temperature and vacuum as the above-described outboard acrylic layer, to form an inboard acrylic layer having a shape generally congruent with that of the outboard acrylic layer. An interlayer of a sheet of polyvinyl butyral about 0.025 inch (0.06 cm) thick was cut to the approximate dimensions of the inboard acrylic layer. The interlayer was interposed between the inboard acrylic layer and the outboard acrylic layer, and the assembly was placed in an autoclave at a temperature of about 210° F. (99° C.) under pressure of about 200 psi for a period of about 3 hours to laminate the assembly to form the outboard pane assembly.

The vibration dampening/sound absorbing pane assembly and the outboard pane assembly were placed in a spacer frame assembly which held the pane assemblies in parallel spaced apart relationship to form an airspace of about 1.22 inches (3.01 cm) in thickness between the vibration dampening/sound absorbing pane assembly and the outboard pane assembly to form an aircraft transparency in accordance with the present invention.

The vibration dampening/sound absorbing defogging aircraft transparency assembled as described above was installed in an airframe and was subjected to flight evaluation and observation under actual flight conditions. The aircraft transparency was found to have vibration dampening/sound absorbing and defogging properties at least as good as that of known aircraft transparencies.

The aircraft transparency of the present invention has several advantages over those known in the art as described above. It is lighter in weight, less complex to manufacture, less expensive to manufacture, and requires fewer components to provide vibration dampening/sound absorbing properties, and optionally, deicing/defogging/defrosting properties at least as effective as the more complex aircraft transparencies now known in the art as described above.

As may now be appreciated, the above embodiments of the invention were presented for purposes of illustration and are not limiting to the invention. The scope of the invention disclosed herein is defined by the following claims.

What is claimed is:

1. A vibration dampening sound absorbing aircraft transparency comprising:
   an outboard pane assembly;
   a vibration dampening/sound absorbing pane assembly wherein said vibration dampening/sound absorbing pane assembly is a laminate comprising a substrate, an adhesive interlayer deposited over the substrate and a sound dampening material layer deposited over said adhesive interlayer and adhered to the substrate by the adhesive interlayer;
   a spacer frame assembly for retaining said outboard pane and said vibration dampening/sound absorbing pane assembly in spaced-apart generally parallel facing relationship and providing an airspace between said outboard pane and said vibration dampening/sound absorbing pane assembly.

2. The aircraft transparency of claim 1 wherein the sound dampening material layer is a laminate comprising a polyvinyl butyral layer and a polymer disposed over and in contact with said polyvinyl butyral layer.

3. The aircraft transparency of claim 2 wherein said polymer is a polyester.

4. The aircraft transparency of claim 2 wherein said sound dampening material layer further comprises a layer of an abrasion resistant coating disposed over and in contact with said polyester polymer layer.

5. The aircraft transparency of claim 1 wherein said adhesive interlayer is selected from the group consisting of polyvinyl butyral and urethane.

6. The aircraft transparency of claim 5 wherein said polyvinyl butyral adhesive interlayer is about 0.02 to 0.03 inch (0.051 to 0.08 cm) thick.

7. The aircraft transparency of claim 1 wherein said substrate is a glass substrate and is about 0.06 to 0.12 inch (0.15 cm to 0.30 cm) thick.

8. The aircraft transparency of claim 7 wherein said glass is a chemically tempered glass sold by PPG Industries, Inc., under the mark Herculite® II.

9. The aircraft transparency of claim 8 wherein said Herculite® chemically tempered glass substrate is about 0.078 inch (0.20 cm) thick.

10. The aircraft transparency of claim 1 further comprising a transparent electroconductive coating interposed between said adhesive interlayer and said substrate and a means for applying electrical current to said electroconductive coating to heat said electroconductive coating.

11. The aircraft transparency of claim 10 wherein means for applying electrical current to said electroconductive coating comprises a pair of bus bars bonded to said substrate in spaced-apart parallel relationship along the longitudinal edges of said substrate.

12. The aircraft transparency of claim 10 wherein said transparent electroconductive coating is selected from the group consisting of tin oxide and indium tin oxide.

13. The aircraft transparency of claim 10 wherein said transparent electroconductive coating is about 200 to 1300 Angstroms thick.

14. The aircraft transparency of claim 1 wherein said outboard pane is a laminated pane comprising an inboard acrylic layer, an outboard acrylic layer and an interlayer interposed between and adhering together said inboard acrylic pane and said outboard acrylic pane.

15. The aircraft transparency of claim 14 wherein said inboard acrylic layer is stretched acrylic and is about 0.2 to 0.4 inch (0.51 cm to 1.02 cm) thick, said outboard acrylic layer is stretched acrylic and is about 0.2 to 0.4 inch (0.51 to 1.02 cm) thick and said interlayer is polyvinyl butyral and is about 0.025 to 0.05 inch (0.06 to 0.13 cm) thick.

16. The aircraft transparency of claim 1 wherein said vibration dampening/sound absorbing pane is retained by said spacer frame assembly with said sound dampening material layer disposed toward said airspace.

17. The aircraft transparency of claim 1 wherein said vibration dampening/sound absorbing pane is retained by said spacer frame assembly with said substrate disposed toward said airspace.

18. In a vibration dampening sound absorbing aircraft transparency of the type having an outboard pane assembly, vibration dampening/sound absorbing pane assembly and a spacer frame assembly mounting the outboard pane assembly and vibration dampening/sound absorbing pane assembly to space the outboard pane assembly from the vibration dampening/sound absorbing pane assembly from one another, the improvement comprising:
   the vibration dampening/sound absorbing pane assembly including an electroconductive coating, a plurality of layers laminated together with at least one of the layers having sound dampening properties and at least one of the sound absorbing layers includes a polyvinyl butyral layer and a means for applying electrical current to the electroconductive coating to heat the coating.

19. A heatable vibration dampening/sound absorbing pane comprising:
   a substrate having a major surface;
   an electroconductive coating on a major surface of the substrate;
   spaced bus bar in electrical contact with the coating;
   an adhesive interlayer disposed over the coating; and
   a sound dampening laminate adhered to said adhesive interlayer.

* * * * *